(12) United States Patent
Yoshida et al.

(10) Patent No.: US 11,525,753 B2
(45) Date of Patent: Dec. 13, 2022

(54) CONTACT VIBRATION DETECTION DEVICE, ROTARY MACHINE INCLUDING THE SAME, AND CONTACT VIBRATION DETECTION METHOD

(71) Applicant: MITSUBISHI HEAVY INDUSTRIES, LTD., Tokyo (JP)

(72) Inventors: Tadashi Yoshida, Tokyo (JP); Ryoji Sasaki, Tokyo (JP); Hidetaka Nishimura, Nagasaki (JP); Takeshi Tsuji, Nagasaki (JP)

(73) Assignee: MITSUBISHI HEAVY INDUSTRIES MARINE MACHINERY & EQUIPMENT CO., LTD, Nagasaki (JP)

( * ) Notice: Subject to any disclaimer, the term of this patent is extended or adjusted under 35 U.S.C. 154(b) by 141 days.

(21) Appl. No.: 16/609,293

(22) PCT Filed: Jan. 17, 2019

(86) PCT No.: PCT/JP2019/001239
§ 371 (c)(1),
(2) Date: Oct. 29, 2019

(87) PCT Pub. No.: WO2019/187517
PCT Pub. Date: Oct. 3, 2019

(65) Prior Publication Data
US 2020/0056956 A1  Feb. 20, 2020

(30) Foreign Application Priority Data
Mar. 29, 2018 (JP) ............... JP2018-063632

(51) Int. Cl.
*G01M 1/22* (2006.01)
(52) U.S. Cl.
CPC ................... *G01M 1/22* (2013.01)

(58) Field of Classification Search
CPC ....................................................... G01M 1/22
See application file for complete search history.

(56) References Cited

U.S. PATENT DOCUMENTS 5,144,840 A * 9/1992 Whipple, III .......... G01H 1/003
73/660
5,198,763 A 3/1993 Konishi
(Continued)

FOREIGN PATENT DOCUMENTS

CN  102449445 A  5/2012
CN  102672539 A  9/2012
(Continued)

OTHER PUBLICATIONS

English translation of JPS6243538 specification, accessed from espacenet.com May 27, 2021.*
(Continued)

*Primary Examiner* — Nimeshkumar D Patel
*Assistant Examiner* — Jean F Morello
(74) *Attorney, Agent, or Firm* — WHDA, LLP

(57) ABSTRACT

A contact vibration detection device 100 for detecting contact vibration due to contact between a rotational shaft 12 and a stationary part 13 includes: a rotation waveform determination unit 101 configured to determine a rotation waveform of the rotational shaft 12 based on displacement of the rotational shaft 12 during rotation; a parameter change detection unit 102 configured to detect a change in a parameter of at least one of an effective value of the rotation waveform or a phase angle of the rotation waveform; and a contact vibration determination unit 103 configured to determine whether the contact vibration occurs based on presence or absence of the change in the parameter.

5 Claims, 7 Drawing Sheets

(56) References Cited

U.S. PATENT DOCUMENTS

| | | | |
|---|---|---|---|
| 2012/0072136 A1 | 3/2012 | Hedin | |
| 2012/0232812 A1 | 9/2012 | Okita et al. | |
| 2016/0377510 A1 | 12/2016 | Stanley | |
| 2017/0342993 A1 | 11/2017 | Yoshida et al. | |
| 2018/0010980 A1 | 1/2018 | Shenouda | |

FOREIGN PATENT DOCUMENTS

| | | | | |
|---|---|---|---|---|
| CN | 107003212 | A | 8/2017 | |
| JP | 54-106401 | U | 7/1979 | |
| JP | 58-47735 | U | 3/1983 | |
| JP | 58-47736 | U | 3/1983 | |
| JP | 61-12027 | U | 1/1986 | |
| JP | 62-43538 | A | 2/1987 | |
| JP | 2-232529 | A | 9/1990 | |
| JP | H07253493 | A * | 10/1995 | ............. Y02E 30/30 |
| JP | H11-160482 | A | 6/1999 | |
| JP | 2002-372452 | A | 12/2002 | |
| JP | 2004-19841 | A | 1/2004 | |
| JP | 2008-082879 | A | 4/2008 | |

OTHER PUBLICATIONS

International Search Report dated Apr. 9, 2019, issued in counterpart International Application No. PCT/JP2019/001239(2 pages).

The Office Action dated Oct. 12, 2020, issued in counterpart CN application No. 201980001786.X, with English Translation. (20 pages).

Extended Search Report dated May 20, 2020, issued in counterpart EP Application No. 19775623.2 (9 pages).

Office Action dated May 29, 2020, issued in counterpart KR Application No. 10-2019-7028334, with English translation (8 pages).

Patel, Tejas et al: "Coupled bending-torsional vibration analysis of rotor with rub and crack", Journal of Sound and Vibration, Elsevier, Amsterdam, NL, vol. 326, No. 3-5, Oct. 9, 2009, pp. 740-752, XP026422078; Cited in EP Office Action dated Feb. 17, 2021. (13 pages).

Office Action dated Feb. 17, 2021, issued in counterpart EP Application No. 19775623.2. (7 pages).

* cited by examiner

CONTACT VIBRATION DETECTION DEVICE, ROTARY MACHINE INCLUDING THE SAME, AND CONTACT VIBRATION DETECTION METHOD

TECHNICAL FIELD

The present invention relates to a contact vibration detection device, a rotary machine including the same, and a contact vibration detection method.

BACKGROUND ART

In a rotary machine such as a turbo machine, a turbine, and a compressor, a rotational shaft rotates. During rotation of the rotational shaft, the rotational shaft may come into contact with a stationary part such as a seal part and an oil thrower part, which causes contact vibration. Further, contact between the rotational shaft and the stationary part increases the temperature of the contact portion and causes the rotational shaft to bend. When the rotational shaft bends, the degree of unbalance may change. In this case, contact vibration is further amplified.

As described above, once contact vibration occurs, contact vibration may gradually increase. Therefore, it is preferable to stop rotation of the rotary machine when contact vibration is detected, in view of appropriate maintenance of the rotary machine. Thereby, it is possible to investigate the cause of contact vibration in a stopped state and extend the lifetime of the rotary machine.

One of contact vibration detection techniques is disclosed in Patent Document 1. Patent Document 1 describes that vibration of a rotary machine is detected by a vibration detector (especially see paragraph 0015). In this technique, vibration vector is determined based on the detected vibration, and the presence or absence of contact vibration is determined based on the determined vibration vector (especially see paragraphs 0016, 0017, and 0021).

CITATION LIST

Patent Literature

Patent Document 1: JP2002-372452A

SUMMARY

Problems to be Solved

In the technique disclosed in Patent Document 1, a vibration detector is used for detecting vibration of a rotational shaft. However, the vibration detector cannot be provided to a relatively small rotary machine. Accordingly, in this case, contact vibration cannot be detected by the technique disclosed in Patent Document 1. Further, even in a rotary machine including a vibration detector, if contact vibration can be detected without the vibration detector, the vibration detector can be advantageously eliminated. Therefore, there is a need for a technique that can detect contact vibration regardless of the presence or absence of the contact detector.

The present invention was made in view of the above, and an object of at least one embodiment of the present invention is to provide a contact vibration detection device, a rotary machine including the same, and a contact vibration detection method whereby it is possible to detect contact vibration of a rotary machine.

Solution to the Problems (1) According to at least one embodiment of the present invention, a contact vibration detection device for detecting contact vibration due to contact between a rotational shaft and a stationary part comprises: a rotation waveform determination unit configured to determine a rotation waveform of the rotational shaft based on displacement of the rotational shaft during rotation; a parameter change detection unit configured to detect a change in a parameter of at least one of an effective value of the rotation waveform or a phase angle of the rotation waveform; and a contact vibration determination unit configured to determine whether the contact vibration occurs based on presence or absence of the change in the parameter.

With the above configuration (1), the rotation waveform is determined based on displacement measured by the displacement sensor, for instance, and contact vibration due to contact of the rotational shaft with the stationary part is detected based on the change in the parameter of the determined rotation waveform. Thus, it is possible to detect contact vibration of the rotary machine regardless of a vibration detector.

(2) In some embodiments, in the above configuration (1), the contact vibration determination unit is configured to determine that the contact vibration occurs if the change in the parameter continues for a predetermined period.

With the above configuration (2), it is possible to suppress the erroneous determination that the contact vibration occurs when the parameter is changed for some reason although the contact vibration does not actually occur. Accordingly, it is possible to improve the detection precision.

(3) In some embodiments, in the above configuration (1) or (2), the rotational shaft has a pulse waveform generation part for superimposing a pulse waveform as a reference of the phase angle on the rotation waveform, and the parameter change detection unit is configured to detect a change in the phase angle relative to the pulse waveform and thereby detect the change in the parameter.

With the above configuration (3), since the position of the pulse waveform superimposed on the rotation waveform is unchanged regardless of the change in phase angle of the rotation waveform due to contact with the stationary part, by calculating the phase angle change of the rotation waveform relative to the pulse waveform, which is the reference signal, it is possible to precisely detect the change in parameter.

(4) In some embodiments, in the above configuration (3), the pulse waveform generation part includes two or more notches formed in an outer peripheral surface of the rotational shaft at equal intervals in a circumferential direction of the rotational shaft.

With the above configuration (4), it is possible to easily form the notches in the rotational shaft. Further, the notches improve balance during rotation of the rotational shaft and allows the rotational shaft to stably rotate.

(5) In some embodiments, in the above configuration (3) or (4), the parameter change detection unit is configured to divide the detected pulse waveform to determine a reference pulse waveform, and the parameter change detection unit is configured to detect a change in the phase angle relative to the reference pulse waveform and thereby detect the change in the parameter.

With the above configuration (5), by division, it is possible to determine one reference pulse waveform from the two or more pulse waveforms corresponding to the notches. Accordingly, it is possible to easily calculate the phase angle relative to the reference pulse waveform.

(6) In some embodiments, in any one of the above configurations (1) to (5), the parameter change detection unit is configured to detect a change in the effective value and a change in the phase angle, and the contact vibration determination unit is configured to determine that the contact vibration occurs if the change in the effective value and the change in the phase angle are detected.

With the above configuration (6), it is possible to improve the detection precision of contact vibration.

(7) In some embodiments, in any one of the above configurations (1) to (6), the contact vibration detection device further comprises a notification unit configured to notify a user of occurrence of the contact vibration if the contact vibration is detected.

With the above configuration (7), it is possible to notify the user of detection of contact vibration and thus prompt user's appropriate action, for instance, prompt the user to stop the operation of the rotary machine.

(8) A rotary machine according to at least one embodiment of the present invention comprises a rotational shaft and the contact vibration detection device described in any one of the above (1) to (7).

With the above configuration (8), it is possible to detect contact vibration caused in the rotary machine and appropriately perform maintenance of the rotary machine.

(9) According to at least one embodiment of the present invention, a contact vibration detection method for detecting contact vibration due to contact between a rotational shaft and a stationary part comprises: a rotation waveform determination step of determining a rotation waveform of the rotational shaft based on displacement of the rotational shaft during rotation; a parameter change detection step of detecting a change in a parameter of at least one of an effective value of the rotation waveform or a phase angle of the rotation waveform; and a contact vibration determination step of determining whether the contact vibration occurs based on the change in the parameter.

With the above method (9), the rotation waveform is determined based on displacement measured by the displacement sensor, for instance, and contact vibration due to contact of the rotational shaft with the stationary part is detected based on the change in the parameter of the determined rotation waveform. Thus, it is possible to detect contact vibration of the rotary machine regardless of a vibration detector.

Advantageous Effects

According to at least one embodiment of the present invention, there is provided a contact vibration detection device, a rotary machine including the same, and a contact vibration detection method whereby it is possible to detect contact vibration of a rotary machine.

DETAILED DESCRIPTION

Figure 1:
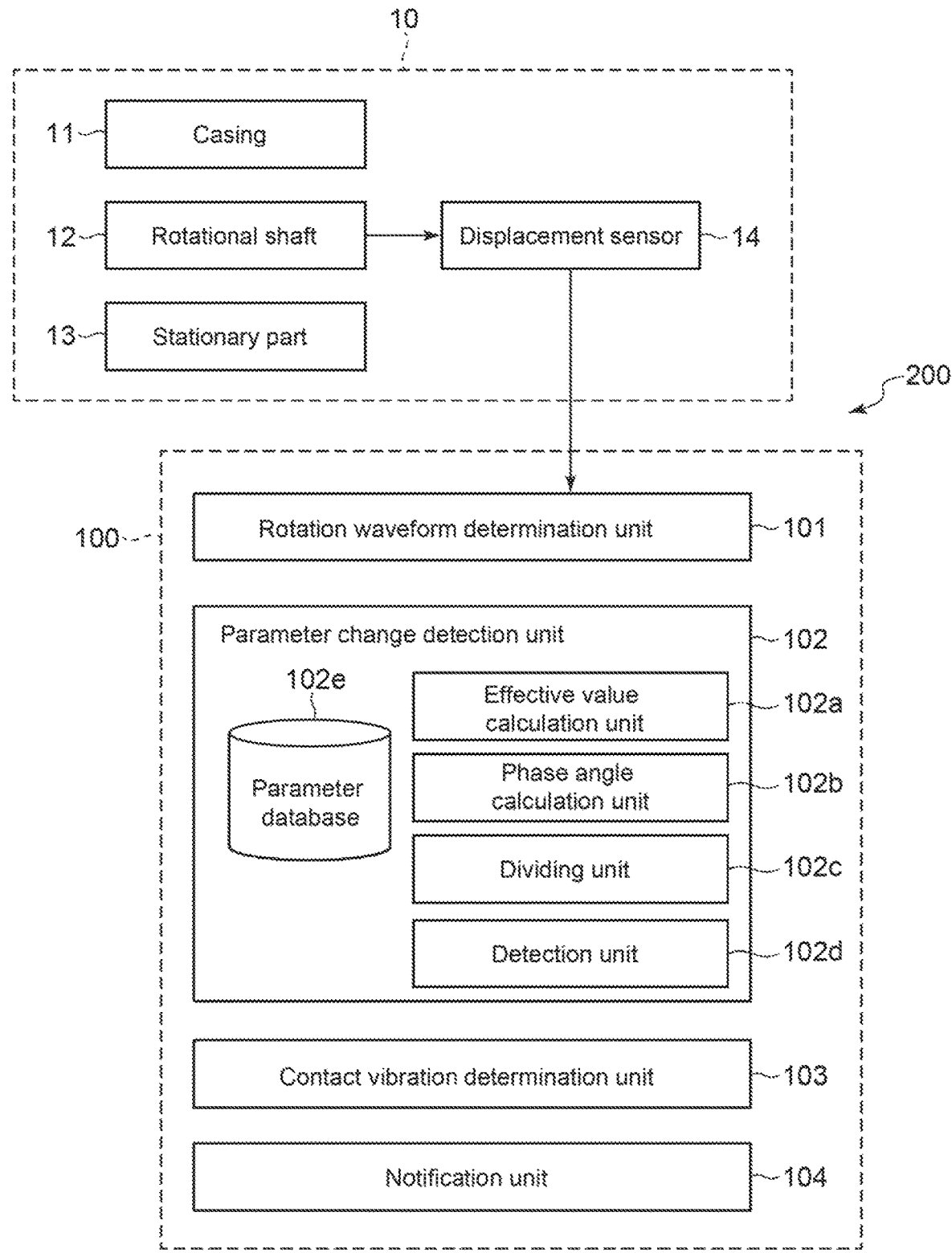
FIG. 1 is a block diagram of a rotary machine to which a contact vibration detection device is applied according to an embodiment of the present invention.

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner. Further, in the following embodiments, similar elements will be indicated by the same reference numerals, and redundant descriptions thereof will be omitted for convenience.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a block diagram of a rotary machine 200 to which a contact vibration detection device 100 is applied according to an embodiment of the present invention. The rotary machine 200 includes a rotary machine body 10 and a contact vibration detection device 100. Among them, the rotary machine body 10 is composed of a turbo machine, a turbine, a compressor, or the like, although not depicted. The contact vibration detection device 100 is used to detect contact vibration caused by contact of a rotational shaft 12 with a stationary part 13 in the rotary machine body 10.

The rotary machine body 10 includes a casing 11, a rotational shaft 12, a stationary part 13, and a displacement sensor 14. The casing 11 accommodates the rotational shaft 12, the stationary part 13, and the displacement sensor 14. In a case where the rotary machine body 10 is a turbo machine, the rotational shaft 12 is rotated by energy of exhaust gas or the like of a ship, for instance. The stationary part 13 is a seal part and an oil thrower part, for instance, although they are not depicted.

Further, the displacement sensor 14 is configured to measure displacement of the rotational shaft 12 during rotation of the rotational shaft 12. The displacement sensor 14 is generally provided to the rotary machine body 10. The displacement sensor 14 may include an eddy-current sensor, for instance. Displacement measured by the displacement sensor 14 is input to a rotation waveform determination unit 101 described later. In an embodiment of the present invention, only one displacement sensor 14 is provided.

Among them, the rotational shaft 12 has a notch 12a (pulse waveform generation part) for superimposing a pulse waveform on a rotation waveform generated as the rotational shaft 12 rotates. This point will be described with reference to FIGS. 2A and 2B.

Figure 2A:
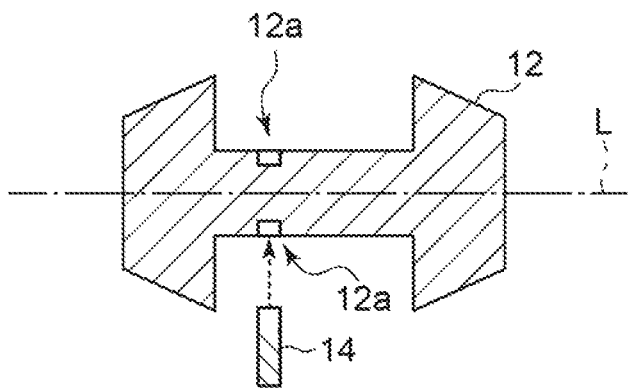
FIG. 2A is a diagram showing a notch formed in a rotational shaft and shows a relative positional relationship between the notch and a displacement sensor.
Figure 2B:
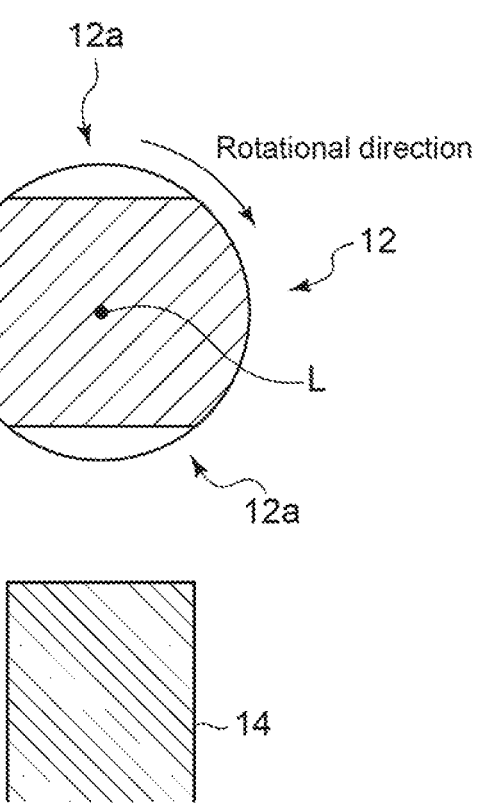
FIG. 2B is a diagram showing a notch formed in a rotational shaft and shows the position of the notch formed in the rotational shaft.

FIGS. 2A and 2B are a diagram showing the notch 12a formed in the rotational shaft 12. FIG. 2A shows a relative positional relationship between the notch 12a and the displacement sensor 14, and FIG. 2B shows the position of the notch 12a formed in the rotational shaft. FIG. 2 also show the displacement sensor 14.

The rotational shaft 12 shown in FIG. 2A rotates around a rotational center line L. Further, the notch 12a, for instance of rectangular cross-section, is formed in the surface of the rotational shaft 12. As shown in FIG. 2B, the notch 12a is formed in the outer peripheral surface of the rotational shaft 12 at equal intervals in the circumferential direction of the rotational shaft 12. The two notches 12a have the same size and the same shape. By forming two (or three or more) notches 12a at equal intervals, the notches 12a can be easily formed in the rotational shaft 12. Further, the equidistant notches improve balance during rotation of the rotational shaft 12 and allows the rotational shaft 12 to stably rotate.

By forming the notch 12a, a pulse waveform is superimposed on a rotation waveform determined by rotation of the rotational shaft 12, which will be described later in more detail.

Referring to FIG. 1 again, the contact vibration detection device 100 includes a rotation waveform determination unit 101, a parameter change detection unit 102, a contact vibration determination unit 103, and a notification unit 104. Among them, the parameter change detection unit 102 includes an effective value calculation unit 102a, a phase angle calculation unit 102b, a dividing unit 102c, a detection unit 102d, and a parameter database 102e.

The rotation waveform determination unit 101 determines a rotation waveform of the rotational shaft 12 based on displacement of the rotational shaft 12 during rotation. An illustrative example of the shape of the rotation waveform is shown in FIG. 3.

Figure 3:
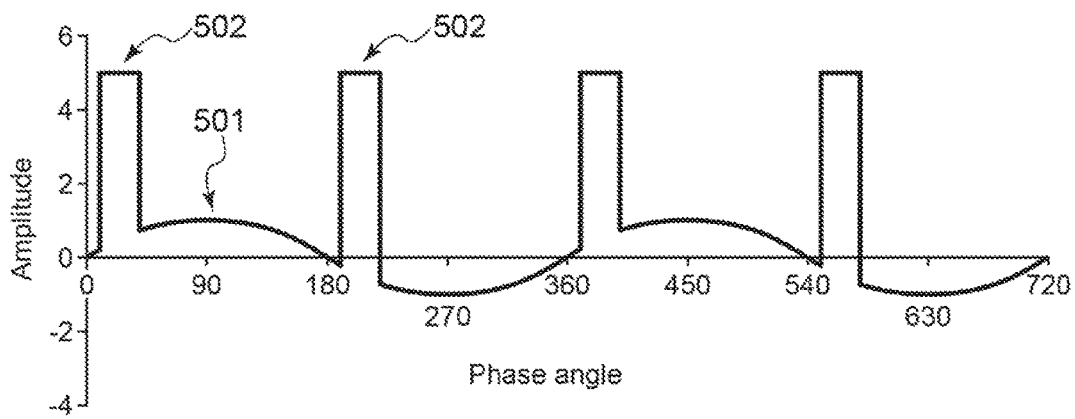
FIG. 3 is a graph showing a rotation waveform of a rotational shaft determined by a rotation waveform determination unit, at time $T_0$.

FIG. 3 is a graph showing a rotation waveform 501 of the rotational shaft 12 determined by the rotation waveform determination unit 101 at time $T_0$. Displacement of the rotational shaft 12 is measured in real time by the displacement sensor 14, and the measured displacement is sent to the rotation waveform determination unit 101 in real time. Accordingly, the shape of the rotation waveform 501, for instance as shown in FIG. 3, is also determined in real time.

The rotation waveform shown in FIG. 3 includes a rotation waveform 501 (maximum amplitude=1) normally generated with rotation of the rotational shaft 12 and two pulse waveforms 502 (maximum amplitude=5) in a range where 0°≤phase angle≤360°. These pulse waveforms 502 are attributable to the two notches 12a described with references to FIGS. 2A and 2B. More specifically, when the rotational shaft 12 rotates, displacement of the rotational shaft 12 largely changes at the notches 12a formed at equal intervals in the outer peripheral surface of the rotational shaft 12. Thus, the pulse waveforms 502 corresponding to the two notches 12a are superimposed on the normal rotation waveform 501 with a phase angle difference of 180°.

The pulse waveform 502 serves as a reference signal of the phase angle in the rotation waveform 501, as described later in more detail. That is, the position of the superimposed pulse waveform 502 is unchanged regardless of the change in phase angle of the rotation waveform 501 due to the rotational shaft 12 acting on the stationary part 13. Accordingly, by calculating the phase angle change of the rotation waveform 501 relative to the pulse waveform 502, which is the reference signal, it is possible to detect the phase angle change of the rotation waveform 501.

Referring to FIG. 1 again, the parameter change detection unit 102 detects the change in parameter, namely, the effective value of the rotation waveform and the phase angle of the rotation waveform. However, the parameter may be one of them. The parameter change detection unit 102 includes an effective value calculation unit 102a, a phase angle calculation unit 102b, a dividing unit 102c, a detection unit 102d, and a parameter database 102e, as described above.

The effective value calculation unit 102a calculates the effective value of the rotation waveform. The rotation waveform here means the rotation waveform 501 described with reference to FIG. 3, for instance. The effective value is preferably calculated based on the rotation waveform obtained when the rotational shaft 12 rotates in a settling state (i.e., when the rotational shaft 12 rotates at a constant rotational speed).

The effective value E of the rotation waveform can be calculated by the following expression (1). Since the size of the pulse waveform is constant, the size (area) of the pulse waveform is not considered in calculating the effective value E for simplicity of calculation.

(Expression 1)

$$E = \sqrt{\frac{1}{T}\int_0^T x(t)^2 dt} \qquad \text{Expression (1)}$$

In the expression (1), x(t) represents a function of the rotation waveform including time t as a variable, and T is a period of the rotation waveform. The calculated effective value E is recorded in the parameter database 102e.

The phase angle calculation unit 102b calculates the phase angle of the rotation waveform. The phase angle here means a phase angle relative to the pulse waveform superimposed on the rotation waveform, i.e., a phase angle difference from the pulse waveform. The rotation waveform here means the rotation waveform 501 described with reference to FIG. 3, for instance, and the pulse waveform means the pulse waveform 502 described with reference to FIG. 3. The phase angle is preferably calculated based on the rotation waveform and the pulse waveform obtained when the rotational shaft 12 rotates in a settling state (i.e., when the rotational shaft 12 rotates at a constant rotational speed).

The position of the pulse waveform superimposed on the rotation waveform is unchanged regardless of the change in phase angle of the rotation waveform due to contact with the stationary part 13. Accordingly, by calculating the phase angle change of the rotation waveform relative to the pulse waveform, which is the reference signal, it is possible to precisely detect the change in phase angle (parameter).

The phase angle of the rotation waveform can be calculated by rotational order ratio analysis and fast Fourier transform. More specifically, the phase angle of a complex function F(t) can be calculated by the following expression (2).

(Expression 2)

$$F(t) = \sum_{n=0}^{N-1} \left( f(x) e^{-i2\pi tx/N} \right) \quad \text{Expression (2)}$$

In the expression (2), the time array f (x) is composed an array of N data elements to be subjected to Fourier transform. The above expression gives frequency t of 0 to N−1th data elements, and the phase angle of the complex function F(t) is determined by the real and imaginary parts of the complex number (e). The calculated phase angle is recorded in the parameter database 102e.

As described above, in an embodiment of the present invention, the phase angle of the rotation waveform relative to the pulse waveform as the reference signal is calculated. However, for simplicity of calculation, it is preferable to divide two pulse waveforms and calculate the phase angle of the rotation waveform relative to one reference pulse waveform obtained by the division. In the following, the division of the rotation waveform and the reference pulse waveform will be described in conjunction with the dividing unit 102c for dividing the rotation waveform.

The dividing unit 102c determines the reference pulse waveform by dividing the pulse waveform detected in the rotation waveform. The pulse waveform to be divided is the two pulse waveforms 502 described with reference to FIG. 3, for instance. By division, one reference pulse waveform is determined from the two pulse waveforms corresponding to the two notches 12a. The reference pulse waveform will now be described with reference to FIG. 3 and FIG. 4.

Figure 4:
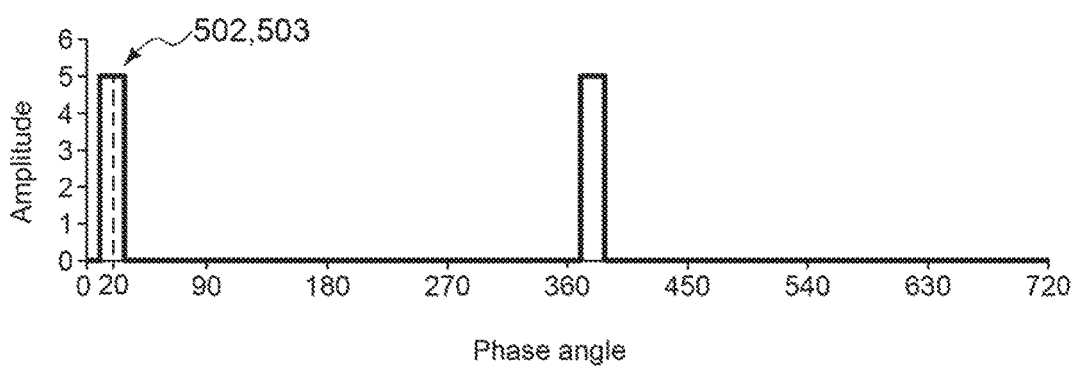
FIG. 4 is a graph showing a reference pulse waveform determined by division of a rotation waveform.

FIG. 4 is a graph showing a reference pulse waveform 503 determined by division of the rotation waveform. FIG. 4 shows one reference pulse waveform 503 (maximum amplitude=5) in a range where 0°≤phase angle≤360°. The amplitude of the reference pulse waveform 503 is the same as the amplitude of the pulse waveform 502 (see FIG. 3).

As described above, in FIG. 3, two pulse waveforms 502 exist in a range where 0°≤phase angle≤360°. Thus, the dividing unit 102c divides the two pulse waveforms 502 and coverts the two pulse waveforms 502 to one pulse waveform 502. Then, the pulse waveform 502 obtained by conversion is determined as the reference pulse waveform 503. In the example shown in FIG. 4, since the phase angle of the reference pulse waveform 503 is 20°, the phase angle of the rotation waveform 501 (see FIG. 3) relative to the reference pulse waveform 503 indicates the degree of deviation from 20°.

By determining the reference pulse waveform 503 through division, it is possible to determine one reference pulse waveform from the two or more pulse waveforms corresponding to the notches 12a. Accordingly, it is possible to easily calculate the phase angle of the rotation waveform 501 (see FIG. 3) relative to the reference pulse waveform 503.

Referring to FIG. 1 again, the detection unit 102d detects the change in effective value calculated by the effective value calculation unit 102a and the change in phase angle calculated by the phase angle calculation unit 102b. More specifically, the detection unit 102d compares current effective value and phase angle with, for instance, effective value and phase angle recorded in the parameter database one minute before, respectively. Further, the detection unit 102d determines whether the effective value and the phase angle are changed. This point will be described with reference to FIGS. 3 and 5.

Figure 5:
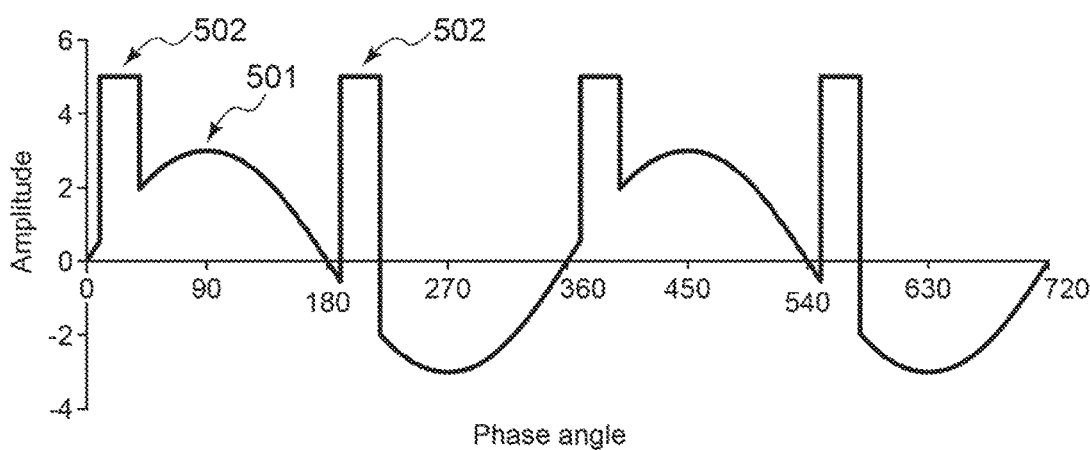
FIG. 5 is a graph showing a rotation waveform of a rotational shaft determined by a rotation waveform determination unit, at time $T_1$.

FIG. 5 is a graph showing the rotation waveform 501 of the rotational shaft 12 determined by the rotation waveform determination unit 101 at time $T_1$. The time $T_1$ here means, for instance, a time one minute after time $T_0$ of the rotation waveform 501 shown in FIG. 3 while the phase angle of the normal rotation waveform 501 is the same. In FIGS. 3 and 5, the phase angle and the amplitude of the pulse waveform 502 are the same. However, the maximum amplitude (maximum amplitude=3) of the rotation waveform 501 is larger than the amplitude (maximum amplitude=1) shown in FIG. 3. Accordingly, although a specific value is not described for simplicity, the effective value calculated from the amplitude is changed between time $T_0$ of the rotation waveform shown in FIG. 3 and time $T_1$ of the rotation waveform shown in FIG. 5. Thus, in this case, the detection unit 102d detects the change in effective value.

Figure 6A:
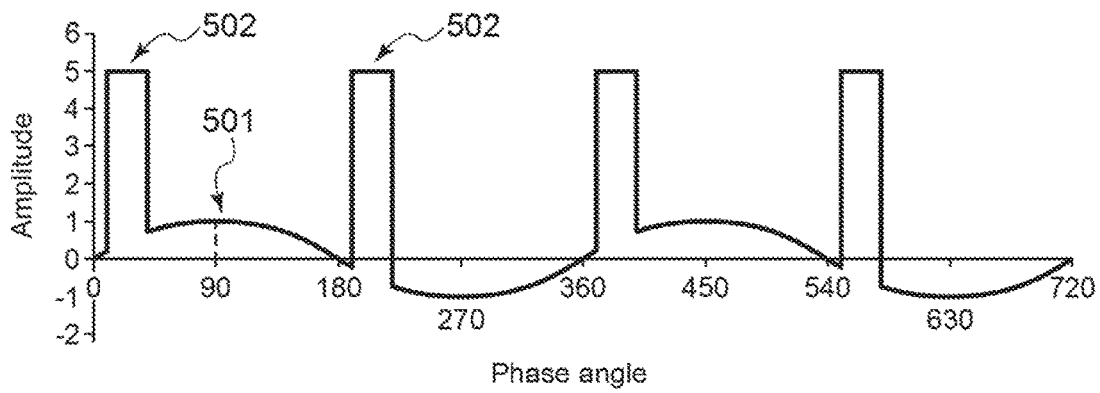
FIG. 6A is a graph showing a rotation waveform of a rotational shaft determined by a rotation waveform determination unit, at time $T_0$.
Figure 6B:
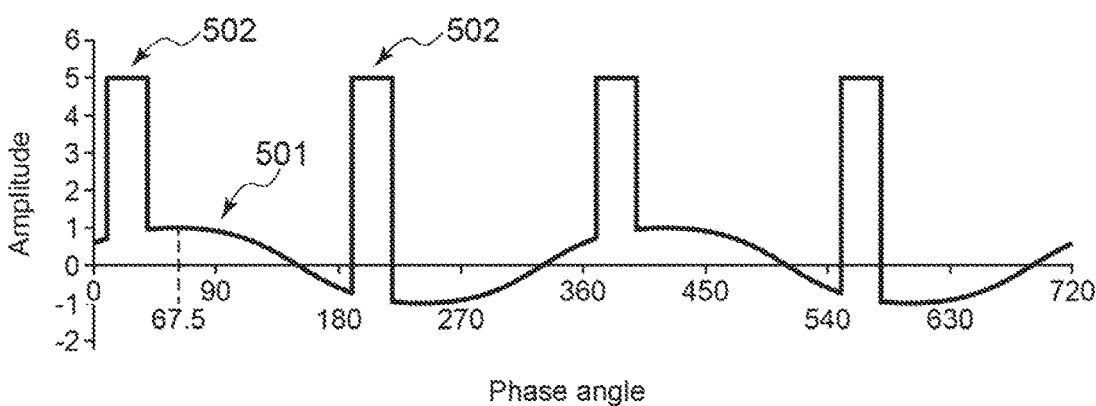
FIG. 6B is a graph showing a rotation waveform of a rotational shaft determined by a rotation waveform determination unit, at time $T_2$.
Figure 6C:
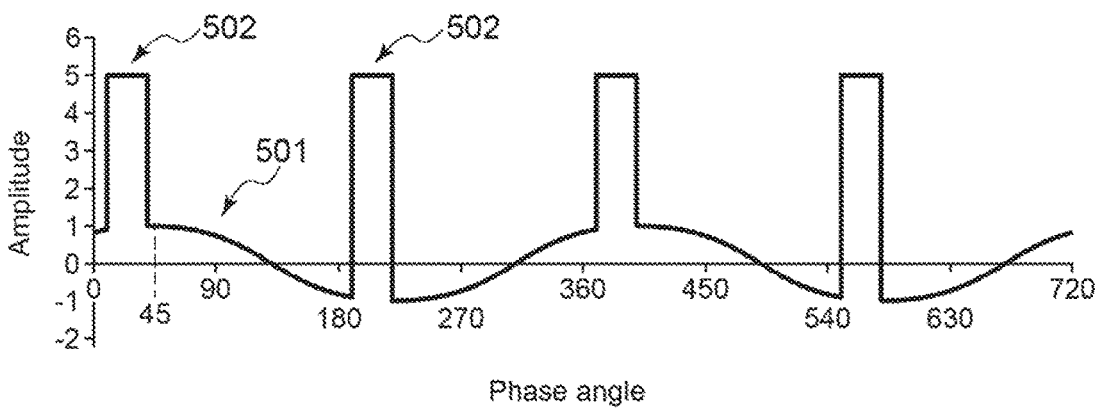
FIG. 6C is a graph showing a rotation waveform of a rotational shaft determined by a rotation waveform determination unit, at time $T_3$.

FIGS. 6A to 6C are a graph showing the rotation waveform 501 of the rotational shaft 12 determined by the rotation waveform determination unit 101. FIG. 6A shows the rotation waveform 501 of the rotational shaft 12 at time $T_0$, FIG. 6B shows the rotation waveform 501 of the rotational shaft 12 at time $T_2$, and FIG. 6C shows the rotation waveform 501 of the rotational shaft 12 at time $T_3$. Among these graphs, the rotation waveform 501 shown in FIG. 6A is the same as the rotation waveform 501 shown in FIG. 3 except that the scale of the vertical axis is different. Further, time $T_2$ is, for instance, a time two minutes after $T_0$, and time $T_3$ is, for instance, a time three minutes after $T_0$.

In FIGS. 6A to 6C, the phase angle and the amplitude of the pulse waveform 502 are the same. However, the position of the antinode of the rotation waveform 501 changes between FIGS. 6A to 6C. More specifically, in FIG. 6A which shows the rotation waveform 501 at time $T_0$, the smallest phase angle of the antinode included in the rotation waveform 501 is 90°. Accordingly, the phase angle (phase angle difference) relative to the reference pulse waveform 503 (see FIG. 4, phase angle 20°) not shown in FIGS. 6A to 6C is 70°. In FIG. 6B which shows the rotation waveform 501 at time $T_2$, the smallest phase angle of the antinode is 67.5°. Accordingly, the phase angle relative to the reference pulse waveform 503 is 47.5°. In FIG. 6C which shows the rotation waveform 501 at time $T_3$, the smallest phase angle of the antinode is 45°. Accordingly, the phase angle relative to the reference pulse waveform 503 is 25°.

As above, the phase angle of the rotation waveform 501 relative to the reference pulse waveform 503 changes between times $T_0$, $T_2$, $T_3$. Thus, in this case, the detection unit 102*d* detects the change in phase angle.

Referring to FIG. 1 again, the parameter database 102*e* stores the effective value calculated by the effective value calculation unit 102*a* and the phase angle calculated by the phase angle calculation unit 102*b*. As described above, since the effective value and the phase angle are calculated every one minute, for instance, the data are also recorded in the parameter database 102*e* every one minute.

The contact vibration determination unit 103 determines whether the contact vibration occurs based on the presence or absence of the change in effective value and phase angle (parameter) detected by the detection unit 102*d*. More specifically, in an embodiment of the present invention, the contact vibration determination unit 103 determines that contact vibration occurs in the rotational shaft 12 when the effective value changes and the phase angle also changes. However, as described later in more detail, it may be determined that contact vibration occurs in the rotational shaft 12 when one of the effective value or the phase angle changes.

Generally, when the rotational speed is stabilized, and the rotational shaft 12 is stable, neither the effective value nor the phase angle changes. However, as for the effective value, contact vibration occurs when the rotational shaft 12 comes into contact with the stationary part 13 due to some cause. At the contact portion, heat is generated by friction, and the temperature rises. As a result, the rotational shaft 12 is bent, and the rotational shaft 12 becomes unstable, which increases contact vibration. By repeating this, the rotation waveform is changed due to instability of the rotational shaft 12. As a result, the effective value calculated from the rotation waveform changes (increases, for instance). Thus, the contact vibration determination unit 103 determines whether the contact vibration occurs based on the presence or absence of the change in effective value.

As for the phase angle, even if the rotational shaft 12 becomes unstable due to contact with the stationary part 13, there is a possibility that the change in effective value (i.e., change in amplitude) is extremely reduced by contact that cancels the instability. In this case, the effective value hardly changes. However, since the one contact portion on the circumference of the rotational shaft 12 is locally heated by contact between the rotational shaft 12 and the stationary part 13, the rotational shaft 12 is thermally bent. As a result, the rotational shaft 12 that is sufficiently balanced becomes unbalanced due to thermal bend, which causes vibration. Further, since the unbalance due to contact is shifted on the circumference over time, the phase angle of the rotation waveform is shifted. Thus, the contact vibration determination unit 103 determines whether the contact vibration occurs based on the presence or absence of the change in phase angle.

Thus, in an embodiment of the present invention, the contact vibration determination unit 103 is configured to determine that contact vibration occurs when the change in effective value and the change in phase angle are detected. Consequently, it is possible to improve the detection precision of contact vibration.

Further, in an embodiment of the present invention, the contact vibration determination unit 103 is configured to determine that contact vibration occurs when the changes in effective value and phase angle (parameter) continue for a predetermined period. In a case where the effective value and the phase angle are calculated at a predetermined time interval (e.g., every one time) as described above, the predetermined period includes that the change occurs 100 times continuously, for instance. Further, for instance, in a case where the effective value and the phase angle are calculated in real time while the rotation waveform is determined, the predetermined period includes that the change occurs for 1 hour 40 minutes continuously.

Thus, it is possible to suppress the erroneous determination that the contact vibration occurs when the parameter (effective value and phase angle) is changed for some reason although the contact vibration does not actually occur. Accordingly, it is possible to improve the detection precision.

The notification unit 104 notifies the user of the occurrence of contact vibration when contact vibration is detected by the contact vibration determination unit 103. The notification unit 104 enables notification to the user about detection of contact vibration and thus prompts user's appropriate action, for instance, prompts the user to stop the operation of the rotary machine 200. The notification unit 104 notifies the user by turning on a lamp (not shown) or displaying a notification on a monitor screen (not shown), for instance.

With the contact vibration detection device 100 having the above configuration, the rotation waveform is determined based on displacement measured by the displacement sensor 14, for instance, and contact vibration due to contact of the rotational shaft 12 with the stationary part 13 is detected based on the change in parameter (effective value and phase angle) of the determined rotation waveform. Thus, it is possible to detect contact vibration of the rotary machine 200 (more specifically, rotary machine body 10) regardless of a vibration detector. An embodiment of the present invention does not exclude the provision of a vibration detector.

In particular, the rotary machine 200 including the rotational shaft 12 and the contact vibration detection device 100 for instance as shown in FIG. 1 enables detection of contact vibration caused in the rotary machine 200 and performs appropriate maintenance of the rotary machine 200.

The contact vibration detection device 100 includes a central processing unit (CPU), a random access memory (RAM), a read only memory (ROM), a hard disk drive (HDD), an interface (I/F), a control circuit, not depicted, and is realized by executing a predetermined control program stored in the ROM by the CPU.

Figure 7:
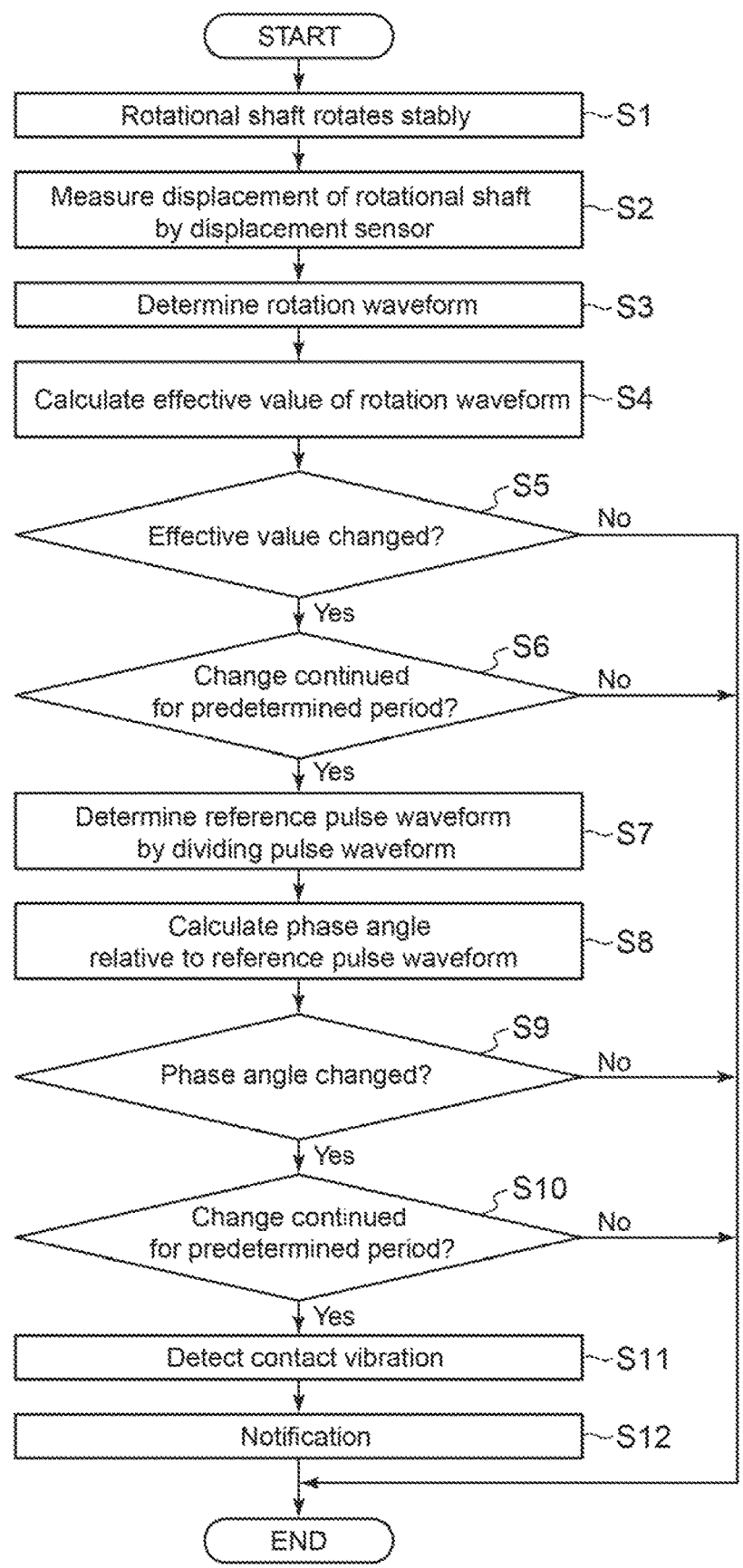
FIG. 7 is a flowchart of a contact vibration detection method performed by a contact vibration detection device according to an embodiment of the present invention.

FIG. 7 is a flowchart of a contact vibration detection method performed by the contact vibration detection device 100 according to an embodiment of the present invention. The contact vibration detection method shown in FIG. 7 detects contact vibration caused by contact of the rotational shaft 12 with the stationary part 13. The contact vibration detection method can be performed by the contact vibration detection device 100 shown in FIG. 1, for instance. In the following, explanation will be given with reference to FIG. 7, in conjunction with FIG. 1.

After the rotational shaft 12 starts rotating, the rotational speed of the rotational shaft 12 becomes constant, and the rotational shaft 12 rotates stably (step S1). Further, the displacement sensor 14 measures displacement of the rotational shaft 12 from the start of the rotation of the rotational shaft 12 (step S2). The displacement is measured in real time while the rotational shaft 12 rotates stably. Further, the rotation waveform determination unit 101 determines the rotation waveform of the rotational shaft 12 based on displacement of the rotational shaft 12 during rotation (step S3, rotation waveform determination step). In this step, in a case where the determination is based on displacement at time $T_0$ for instance, the rotation waveform 501 and the pulse waveform 502 shown in FIG. 3 are determined.

Then, the effective value calculation unit 102*a* calculates the effective value of the determined rotation waveform (step S4). As a specific calculation method, the method described above for the contact vibration detection device 100 can be used. The calculated effective value is recorded in the parameter database 102*e*. Further, the detection unit 102*d* compares the effective values recorded in the parameter database 102*e* and determines whether the effective value of the rotation waveform changes (step S5, parameter change detection step). The change in effective value described here is the change described with reference to FIGS. 3 and 5, for instance.

As a result of determination, if it is determined that the effective value of the rotation waveform changes (Yes in step S5), the contact vibration determination unit 103 determines whether the change continues for a predetermined period (step S6). The predetermined period continuation described here is the same as the predetermined period continuation described above for the contact vibration detection device 100. If the change in effective value continues for a predetermined period (Yes in step S6), the dividing unit 102*c* divides the pulse waveform superimposed on the rotation waveform 501 whose effective value has been calculated, and determines the reference pulse waveform (step S7). The reference pulse waveform here means the reference pulse waveform 503 described above with reference to FIG. 4.

If it is determined that the effective value does not change in step S5 (No in step S5), or if it is determined that the change does not continue for a predetermined period in step S6 (No in step S6), the procedure ends. In this case, the effective value recorded in the parameter database 102*e* is deleted.

After the reference pulse waveform is determined in step S7, the phase angle calculation unit 102*b* calculates the phase angle relative to the reference pulse waveform for the rotation waveform with the determined reference pulse waveform (step S8). As a specific calculation method, the method described above for the contact vibration detection device 100 can be used. The calculated phase angle is recorded in the parameter database 102*e*.

Further, the detection unit 102*d* compares the phase angles recorded in the parameter database 102*e* and determines whether the phase angle relative to the reference pulse waveform changes (step S9, parameter change detection step). The change in phase angle described here is the change described with reference to FIGS. 6A to 6C, for instance.

As a result of determination, if the detection unit 102*d* determines that the phase angle changes (Yes in step S9), the contact vibration determination unit 103 determines whether the change continues for a predetermined period (step S10). The predetermined period continuation described here is the same as the predetermined period continuation described above for the contact vibration detection device 100. If the change continues for a predetermined period (Yes in step S10), the contact vibration determination unit 103 determines that contact vibration due to contact between the rotational shaft 12 and the stationary part 13 is present, and the contact vibration determination unit 103 detects contact vibration (step S11, contact vibration determination step).

If it is determined that the phase angle does not change in step S9 (No in step S9), or if it is determined that the change does not continue for a predetermined period in step S10 (No in step S10), the procedure ends. In this case, the effective value and the phase angle recorded in the parameter database 102*e* are deleted.

After the contact vibration determination unit 103 detects contact vibration, the notification unit 104 notifies the user of detection of contact vibration by turning on a lamp or displaying a notification on a screen, for instance (step S12). Then, the procedure ends.

With the contact vibration detection method described above, the rotation waveform is determined based on displacement measured by the displacement sensor 14, for instance, and contact vibration due to contact of the rotational shaft 12 with the stationary part 13 is detected based on the change in parameter (effective value and phase angle) of the determined rotation waveform. Thus, it is possible to detect contact vibration of the rotary machine 200 (more specifically, rotary machine body 10) regardless of a vibration detector.

Figure 8:
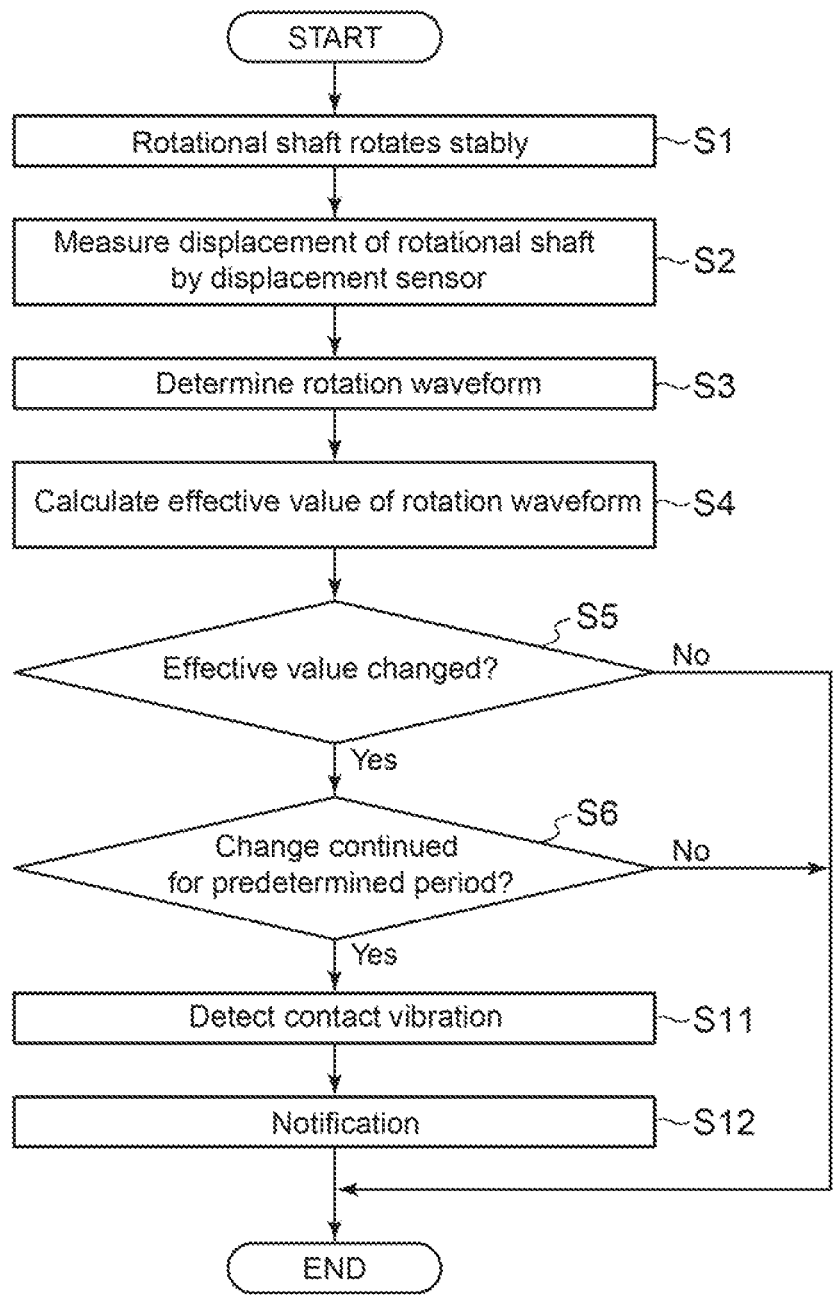
FIG. 8 is a flowchart of a contact vibration detection method according to another embodiment of the present invention.

FIG. 8 is a flowchart of a contact vibration detection method according to another embodiment of the present invention. Redundant descriptions for the same steps as shown in FIG. 7 will be omitted for simplicity of description.

The procedure shown in FIG. 8 is applied to detect contact vibration based on only the change in effective value in the procedure shown in FIG. 7. More specifically, if the change in effective value continues for a predetermined period (Yes in step S6), the contact vibration determination unit 103 determines that contact vibration due to contact between the rotational shaft 12 and the stationary part 13 is present, and the contact vibration determination unit 103 detects contact vibration (step S11, contact vibration determination step). Then, the user is notified (step S12), and the procedure ends, like the procedure shown in FIG. 7.

As described above, even if the rotational shaft 12 becomes unstable due to contact with the stationary part 13, there is a possibility that the change in effective value is extremely reduced by another contact that cancels the instability. However, another contact that completely cancels the instability of the rotational shaft 12 is not very likely to occur. Therefore, if the rotational shaft 12 comes into contact with the stationary part 13, it is usually considered that the effective value of the rotational waveform changes. Since this change in effective value can be calculated by a simple calculation expression, for instance as shown in the expression (1), the change in effective value can be easily detected. Accordingly, with the procedure shown in FIG. 8 for detecting contact vibration only by the effective value, it is possible to simply and easily detect contact vibration.

Figure 9:
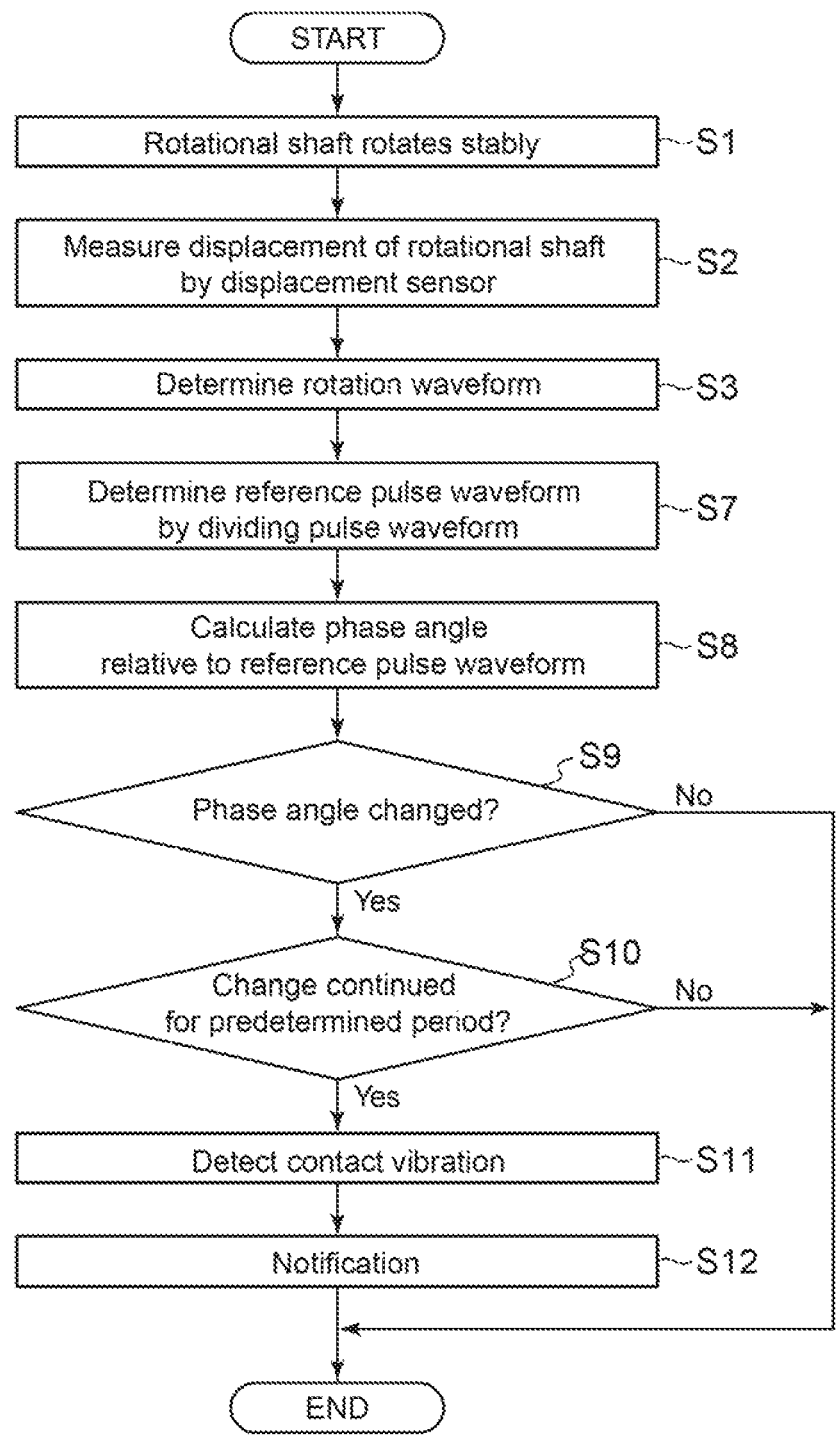
FIG. 9 is a flowchart of a contact vibration detection method according to still another embodiment of the present invention.

FIG. 9 is a flowchart of a contact vibration detection method according to still another embodiment of the present invention. Redundant descriptions for the same steps as shown in FIG. 7 will be omitted for simplicity of description.

The procedure shown in FIG. 9 is applied to detect contact vibration based on only the change in phase angle in the procedure shown in FIG. 7. More specifically, after the rotation waveform determination unit 101 determines the rotation waveform (step S3), the dividing unit 102*c* divides the pulse waveform and determines the reference pulse waveform (step S7). Then, like the procedure shown in FIG. 7, contact vibration is detected by the phase angle (steps S7 to S11), the user is notified (step S12), and the procedure ends.

As described above, if the rotational shaft 12 comes into contact with the stationary part 13, contact vibration occurs. Along with this, the contact portion is heated, and the temperature of the contact portion rises. As a result, the rotational shaft 12 is bent, and the rotational shaft 12 becomes unstable. Thus, by determining the presence or absence of contact vibration based on only the phase angle, it is possible to detect contact vibration.

REFERENCE SIGNS LIST

10 Rotary machine body
11 Casing
12 Rotational shaft
12a Notch
13 Stationary part
14 Displacement sensor
100 Contact vibration detection device
101 Rotation waveform determination unit
102 Parameter change detection unit
102a Effective value calculation unit
102b Phase angle calculation unit
102c Dividing unit
102d Detection unit
102e Parameter database
103 Contact vibration determination unit
104 Notification unit
200 Rotary machine
501 Rotation waveform
502 Pulse waveform
503 Reference pulse waveform

The invention claimed is:

1. A contact vibration detection device for detecting contact vibration due to contact between a rotational shaft and a stationary part, the contact vibration detection device comprising:
   a rotation waveform determination unit configured to determine a rotation waveform of the rotational shaft based on displacement of the rotational shaft during rotation, the displacement being measured by only a single sensor;
   a parameter change detection unit configured to detect a change in a parameter of at least one of an effective value of the rotation waveform or a phase angle of the rotation waveform; and
   a contact vibration determination unit configured to determine whether the contact vibration occurs based on presence or absence of the change in the parameter;
   wherein the rotational shaft has at least one notch for superimposing a pulse waveform as a reference of the phase angle on the rotation waveform, the at least one notch being formed at a position where the rotational shaft being faces the single displace sensor,
   wherein the at least one notch includes two or more notches formed in an outer peripheral surface of the rotational shaft at equal intervals in a circumferential direction of the rotational shaft,
   wherein the parameter change detection unit is configured to determine a reference pulse waveform by dividing a plurality of pulse waveforms corresponding to the two or more notches,
   wherein the parameter change detection unit is configured to detect a change in the phase angle relative to the reference pulse waveform and thereby detect the change in the parameter,
   wherein the parameter change detection unit is configured to detect a change in the effective value and a change in the phase angle,
   wherein the contact vibration determination unit is configured to determine that the contact vibration occurs if both of the change in the effective value and the change in the phase angle are detected, and
   wherein the contact vibration determination unit is configured so as not to determine that the contact vibration occurs when the change in the phase angle is not detected even if the change in the effective value is detected.

2. The contact vibration detection device according to claim 1, further comprising a notification unit configured to notify a user of occurrence of the contact vibration if the contact vibration is detected.

3. A rotary machine comprising:
   a rotational shaft; and
   a contact vibration detection device according to claim 1.

4. The contact vibration detection device according to claim 1,
   wherein the contact vibration determination unit is configured to determine that the contact vibration occurs if the change in the parameter continues for a predetermined period.

5. A contact vibration detection method for detecting contact vibration due to contact between a rotational shaft and a stationary part, the contact vibration detection method comprising:
   a rotation waveform determination step of determining a rotation waveform of the rotational shaft based on displacement of the rotational shaft during rotation, the displacement being measured by only a single displacement sensor;
   a parameter change detection step of detecting a change in a parameter of at least one of an effective value of the rotation waveform or a phase angle of the rotation waveform; and
   a contact vibration determination step of determining whether the contact vibration occurs based on the change in the parameter;
   wherein the rotational shaft has at least one notch for superimposing a pulse waveform as a reference of the phase angle on the rotation waveform, the at least one notch being formed at a position where the rotational shaft being faces the single displace sensor,
   wherein the at least one notch includes two or more notches formed in an outer peripheral surface of the rotational shaft at equal intervals in a circumferential direction of the rotational shaft,
   wherein the parameter change detection step is configured to determine a reference pulse waveform by dividing a plurality of pulse waveforms corresponding to the two or more notches,
   wherein the parameter change detection step is configured to detect a change in the phase angle relative to the reference pulse waveform and thereby detect the change in the parameter,
   wherein the parameter change detection step is configured to detect a change in the effective value and a change in the phase angle,
   wherein the contact vibration determination step is configured to determine that the contact vibration occurs if both of the change in the effective value and the change in the phase angle are detected, and
   wherein the contact vibration determination step is configured so as not to determine that the contact vibration occurs when the change in the phase angle is not detected even if the change in the effective value is detected.

* * * * *